Jan. 22, 1952  A. T. GIGLIA  2,583,480
RADIUS AND ANGLE DRESSER
Filed May 15, 1948  2 SHEETS—SHEET 1
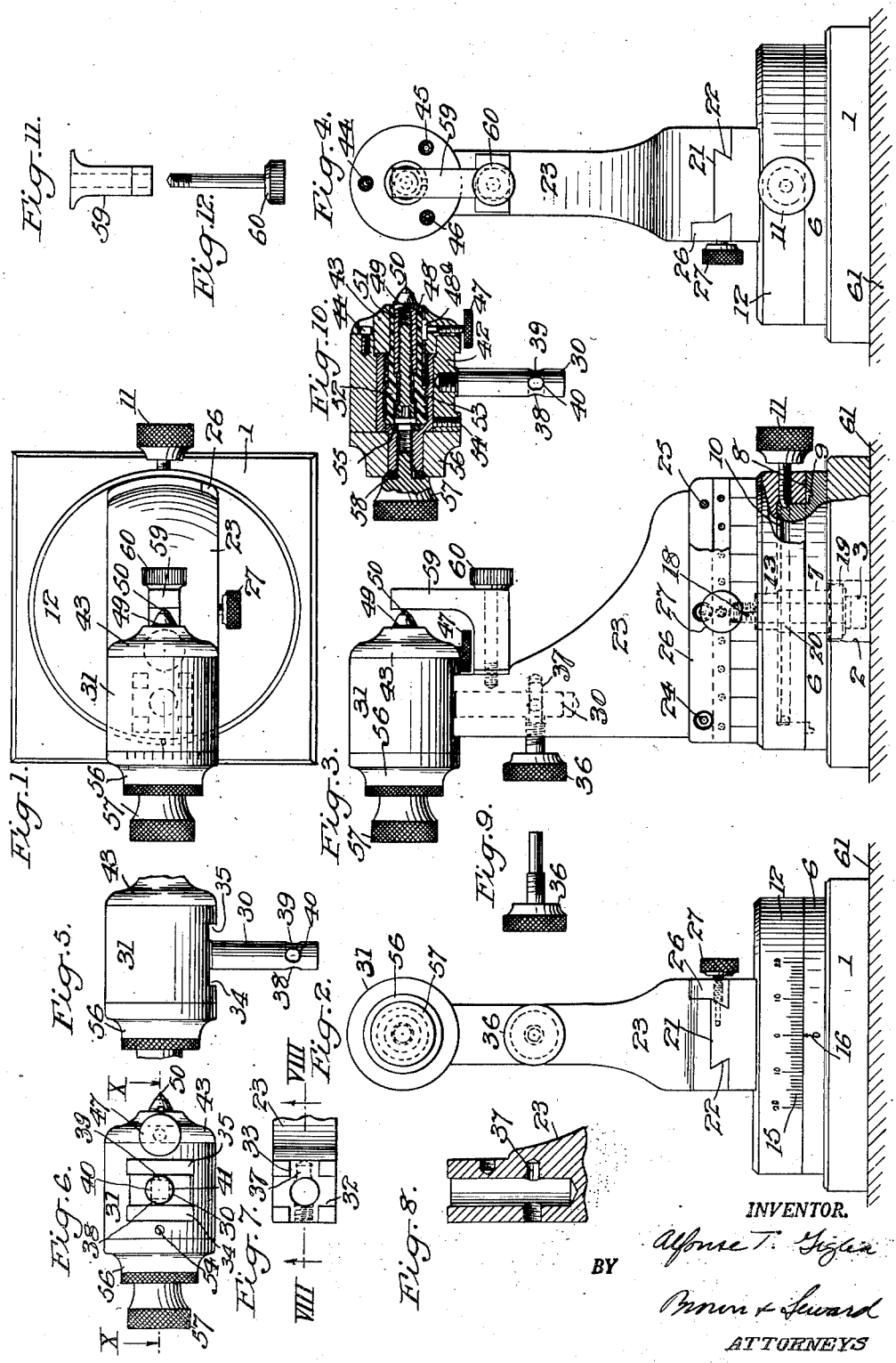
INVENTOR.
Alfonse T. Giglia
BY
Brown & Seward
ATTORNEYS Jan. 22, 1952
A. T. GIGLIA
2,583,480
RADIUS AND ANGLE DRESSER
Filed May 15, 1948
2 SHEETS—SHEET 2
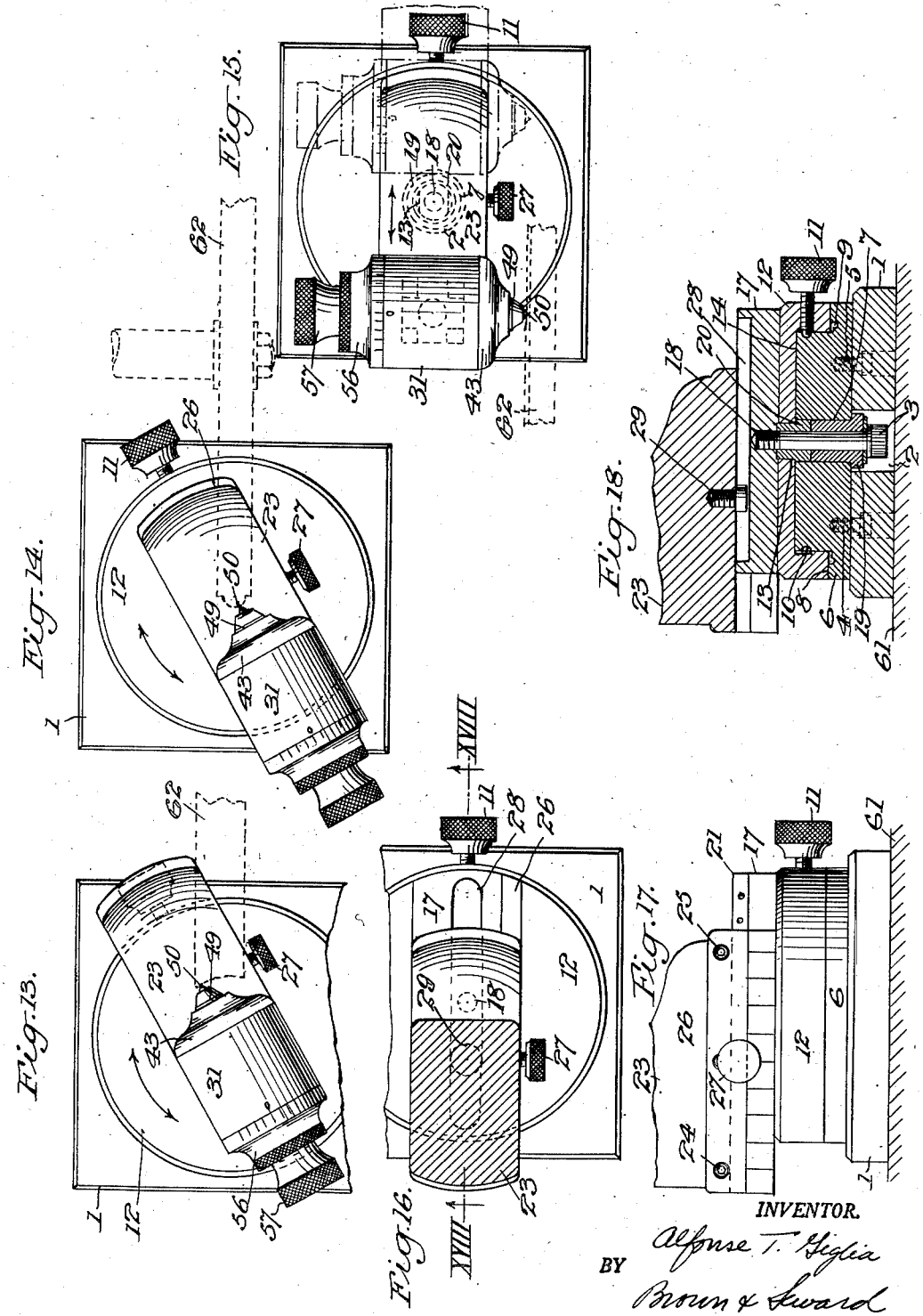
INVENTOR.
Alfonse T. Giglia
BY
Brown & Seward
ATTORNEYS Patented Jan. 22, 1952

2,583,480

UNITED STATES PATENT OFFICE 2,583,480

RADIUS AND ANGLE DRESSER

Alfonse T. Giglia, Bronx, N. Y.

Application May 15, 1948, Serial No. 27,335

7 Claims. (Cl. 125—11)

This invention relates to a tool for dressing or shaping a grindstone to a predetermined radius or angle, it being customary to fixedly mount such a tool on the bed or magnetic chuck of a surface grinder which is provided with means for rotatively holding the stone to be dressed. This invention may also be used on any other machine which requires dressing of the grindstone. The stone will, when properly dressed or shaped, be used to sharpen precision tools or shape any metal or other material having a working surface corresponding to the angle or radius cut on the stone through use of my invention.

The object of my invention is to provide a tool of this type which is capable of unusually accurate and fine adjustments whereby work requiring the utmost precision may be greatly expedited with the accuracy thereof being assured.

Another object of my invention is to provide a tool of the character described whereby the precise angle desired to be cut into the stone may be set on the tool and the tool locked at the desired angle but capable of being moved across the surface to be dressed.

Another object of my invention is to provide a tool of this type on which the exact radius desired to be cut on the stone may be set and the tool locked on this setting but capable of being swung rotatively on the surface to be dressed.

Another object of my invention is to provide a tool of this character with a relatively hard material such as a diamond or the like for dressing the stone or other material, the mounting of said diamond being capable of micrometer adjustment toward and away from the work being dressed with means for locking the mounting including the diamond in the desired position.

A further object is to provide a means for determining the amount of wear on the diamond, said means including a micrometer guage and a removable stop or guage for setting the cutting edge prior to being applied to the work.

A further object is to provide a tool of this type in which means for expelling the diamond in its mounting from its carrying head are located in the interior of the said head.

A further object is to furnish a tool of this type which includes a base therefor on which is rotatably mounted an element shaped to fit precisely over the top of said base and capable of being swung or turned with practically no lost motion.

A further object is to provide a tool of this type which is so constructed and accurate as to be practically devoid of lost motion either during adjustment or operation.

Referring to the accompanying drawings:

Fig. 1 represents a plan view of my new radius and angle cutting device.

Fig. 2 represents one end elevation of the same.

Fig. 3 represents a side elevation of the same with a portion of the base broken away to show parts within.

Fig. 4 represents an end elevation opposite of that shown in Fig. 2.

Fig. 5 represents a detail side elevation of the micrometer head, and a means of holding same on the body.

Fig. 6 represents an inverted plan view of the same, including the adjustable cutting device or dressing element.

Fig. 7 represents a detail plan view of the portion of the vertical support to which the micrometer head is affixed.

Fig. 8 represents a vertical section taken in the plane of the line VIII—VIII of Fig. 7 looking in the direction of the arrows.

Fig. 9 represents a side view of the tapered screw means for locking the cutting device to the body.

Fig. 10 represents a vertical section through the head and cutting device taken in the plane of the line X—X of Fig. 6 looking in the direction of the arrows.

Fig. 11 represents a plan view of a gauge for obtaining the initial setting of the cutting edge of the dressing element when affixed to the body as shown in Figs. 1, 3 and 4.

Fig. 12 represents the means of securing the guage to the body.

Fig. 13 represents a plan view of the device with the parts in position to dress the stone to a concave surface.

Fig. 14 represents a similar view with the parts in position to dress a stone to a convex surface.

Fig. 15 represents a similar view with the parts in still another position to dress a stone to a desired angle.

Fig. 16 represents a horizontal section through the vertical support showing the body adjusted on its base in a different position from that shown in the preceding figs.

Fig. 17 represents a side elevation of the same, and

Fig. 18 represents a vertical section taken on the plane of the line XVIII—XVIII of Fig. 16 looking in the direction of the arrows.

Referring especially to Figs. 17, 3, 2, 16 and 10, the tool rests upon a substantially rectangular base 1 which is adapted to be held in place on the chuck of a surface grinder 6, the said chuck being preferably of the magnetic type.

Base 1 is centrally bored at 2 to receive a screw 3 for purposes described below. Base 1 is also bored and tapped to receive screws 4, 5 which serve to secure a circular element 6 thereto, it being understood that as many screws as desirable, ordinarily four, may be used. The element 6 is provided with a central bore 7 alined with but of less diameter than bore 2 in base 1. Said element is cut back horizontally throughout its circumference to form a flat surface 8, the inner horizontal surface of which is grooved at 9, said groove being annular and of varying depth in one direction and of constant depth in the opposite direction starting from the groove center. The vertical surface of the upper part of element 6 is provided near the top with an annular groove 10 adapted to receive the tapered end of set screw 11 carried in the wall of another rotatable circular element 12. Said element 12 is centrally bored, the bore 13 being on the same vertical axis as but of slightly less diameter than bore 7.

Rotatable element 12 is centrally recessed at 14 to precisely fit the upper part of element 6, the depending outer portion of said first named element being machined to fit the vertical wall of the said upper part of element 6 as well as the flat surface 8 thereof. When the above contacting surfaces are properly oiled or lubricated before assembly, no air is permitted to remain therebetween and a sliding fit is accomplished in which lost motion is negligible.

The outer circumference of element 12 is furnished with a suitable scale 15, the "zero" point of which is matched with the scribe mark 16 on the outer circumference of element 6.

Rigidly secured to the top of element 12 is an oblong rectangular block 17, tapped centrally at 18 to receive the end of screw 3 whereby the parts 1, 6, 12 and 17 are held together. The desired movement of 12 on 6 is made possible by fitting the flanged sleeve 19 into bores 2 and 7 and a second flanged sleeve 20 above 19 into bores 7 and 13. It will be noted that sleeve 20 extends slightly into a chamfered groove in the bottom of block 17 so that said block is so positioned as to match up the "zero" point and scribe mark mentioned above when properly assembled. Also a washer spaces screw head 3 from the flange of sleeve 19.

Block 17 is under-cut longitudinally on its top surface equi-distant each side of the center and at an angle of approximately 45° from the horizontal to form a tongue 21 adapted to fit undercut 22 in a vertical support 23 which is slidably mounted on said tongue 21 by fitting it over said tongue from one side and clamping to it by means of screws 24, 25, a piece 26 shaped to fit one side of said tongue 21 and support 23. The undercut portion of block 17 is bored at equally spaced intervals longitudinally to receive the end of set screw 27 supported in piece 26 in a suitable tapped horizontal hole.

Tongue 21 (see Fig. 18) is provided with a cut out portion 28 which permits the longitudinal travel therein throughout its length of the head of a screw 29 carried by the bottom of vertical support 23, the walls of said cut out acting as limit stops for the movement of support 23. Block 17 is also suitably marked on its outer surface to coact with a scribe mark on piece 26, the said "zero" points being alined when the support is in its "middle" position, i. e. with equal adjustment available in opposite directions.

The top portion of support 23 (see Fig. 7) is vertically bored to receive the locking and alining shaft 30 screwed into the bottom of a so called micrometer head 31 to be herein after described. The horizontal surface of said top portion is provided with two grooves 32, 33 intersecting at right angles in the center of said surface, said grooves forming projecting corners on said top portion adapted to enter complementary shallow grooves 34, 35 on the bottom of the micrometer head 31 whereby correct placements of the head differing by exactly 90° are ensured. As will be explained below these tongue and groove connections assist in maintaining the head 31 in its desired position and enable same to resist forces which might tend to displace it.

Support 23 is tapped to receive set screw 36, which is tapered so that there is a difference of approximately .003 between the middle portion thereof and the end received in bore 37 of support 23. This taper permits the screw to pass through the alined holes 38, 39 which are bored at right angles to the vertical axis of shaft 30 and made slightly elliptical in shape and enter bore 37. Setting up on screw 36 forces it against the upper surface of hole 38 and bore 37 whereby due to the taper above described the shaft 30 is pulled downwardly, the grooves 34, 35 firmly seated over the projecting corners formed by the grooves 32, 33 and the micrometer head 31 is locked to support 23 (see Figs. 3, 5, 6, 7, 8 and 9). It should also be noted that holes 40, 41 are bored at right angles to holes 38, 39 to which they correspond in shape and location, i. e. all on the same horizontal axis, so head 31 may be locked at right angles to the position first described.

The micrometer head 31 (see Fig. 10), in addition to the features previously mentioned, includes a hollow cylindrical portion 42, the bottom of which has the grooves 34, 35. Fitted into this cylinder at one end is a flanged sleeve 43 secured thereto by suitable means such as screws 44, 45, 46, countersunk in the flange. The bottom of this flange is tapped vertically to receive a screw 47, the inner end of which engages a key 48a abutting the outer circumference of a diamond mounting holder 48 to secure same against longitudinal displacement, and to properly aline same.

This holder 48 is held in any well known or approved manner. Mounting 49 is held in 48 by screw 52 and is provided with an internally threaded recess 51 adapted to receive the screw 52 as will be described. Holder 48 is threaded externally at its larger end into a flanged sleeve 53 having the inner surface of the flange threaded. This sleeve 53 is secured in place by screw 54 threaded into the underside of cylindrical portion 42, and an annular shoulder abutting 42 holds sleeve 53 against rearward movement when turned as described below.

Screw 52 has its head slightly spaced from a hard metal washer or bushing 55 abutting against the inner end of the smaller end of sleeve 53. An end piece 56 fits over said smaller end of sleeve and abuts cylinder 42, both 56 and 42 being provided with cooperating indicia reading in thousandths of an inch. End piece 56 is normally freely rotatable unless locked against cylinder 42 and sleeve 53 by means of a screw 57 passed through the bore in said piece 56 and received in the internal threads of the small end of sleeve 53.

The said end of sleeve 53 almost abuts the face of screw head 57 which just outside the diameter of said end is provided with a slight annular groove. End piece 56 just where it would ordinarily contact the outer end surface of 53 is bevelled off at an angle of approximately 45°. A small round metallic split ring 58 is placed in this cut out and when the screw 57 is set up the ring becomes jammed against the 45° surfaces of 56 thereby locking 57 to 56 and 53 and enabling them to be turned therewith.

The above mentioned construction enables the diamond mounting and consequently the diamond to be moved longitudinally toward and away from the gauge 59 which is secured in place for this purpose by means of screw 60 received in support 23.

The diamond mounting, including the diamond 50, may be removed by unscrewing 57 and inserting an "allen" wrench into the recessed head of screw 52. As this screw is backed out, the head thereof abuts washer 55 and the coaction of the screw with the internal thread of diamond mounting 49 jacks said mounting out so that it may be removed and replaced when necessary due to wear or damage or to change to a smaller or larger diamond.

The operation of my device is as follows:

The grindstone 62 shown in dotted outline in Figs. 13 to 15 inclusive to be dressed (the work to be developed into a predetermined peripheral contour) is mounted on a rotatable shaft in the usual manner and the tool is placed in operative position on the magnetic chuck of a surface grinder. To dress the stone to the desired radius, first screw gauge 59 in place on support 23 and turn screw 57 until the point of diamond 50 just touches gauge 59. Hold end piece 56 and back off screw 57 slightly and aline the "zero" marks on 56 and cylinder 31. The tool is now set at its neutral point and after removing the gauge, the radius desired may be set by locking parts 57 and 56 as above described and then setting the desired radius in thousandths of an inch from the scale on 56 by manipulating the locked parts. This micrometer head 31 has a range of ¾". If larger radius is desired, the angle movement bearing comprising elements 6 and 12 with the set screw 27, may be used by means of which the support 23 carrying head 31 may be moved in ½" steps toward or away from the stone to be dressed. The direction of motion of said support 23 is determined according to the type of curve desired i. e., either concave or convex. If the former, the head is moved forward of the centre of rotation of the element 12, if convex, rearwardly of the center. It will be understood that the longitudinal axis of the micrometer head is set perpendicular to a chord of the circle on which the curve is being cut and its horizontal center line corresponds with the center of the stone. When the desired adjustments have been made, tighten the set screw 47 and loosen the radius bearing set screw 11. The tool is then ready to dress the stone to the desired radius.

When it is desired to dress the stone to a predetermined angle, the "zero" setting of the diamond is determined as above described. Gauge 59 is then removed and radius bearing set screw 11 is loosened. When the predetermined degree of angle has been set as noted on scale 15 as read from scribe mark 16 on the outer circumference of element 6, radius bearing set screw 11 is tightened to lock the tool on this setting. As the longitudinal axis of the tool should be perpendicular to the surface to be dressed, it may be necessary to remove screw 36 so that the head 31 can be raised and turned 90° in the direction required. Then the head is lowered, alined by corner projections on support 23 and grooves 34, 35 on head 31, shaft 30, and locked in place by setting up on tapered screw 36 in holes 38, 39 or 40, 41 as suitable, and in bore 37. Angle bearing set screw 27 is backed out and the tool is ready to dress the stone to the required angle with the backward and forward movement of 23.

It will be seen from the above that I have provided a tool of this character in which versatility of adjustment is accomplished as desired and whereby accuracy is insured by the positive locking and lack of lost motion in the several elements.

While it is evident that various changes may be made in the construction, form and arrangement of the several parts without departing from the spirit and scope of my invention as particularly shown and described herein, I do not intend to be limited thereto except as set forth in the following claims.

What I claim is:

1. A tool comprising a base, a circular element affixed thereon having horizontal and vertical surfaces, a second circular element rotatably mounted on said first named element, a block mounted on said rotatable element, means releasably connecting the elements and block to the base and to one another, a vertical support mounted on said block, a micrometer head carried by said vertical support and a dressing element, mounted in said head, the circular rotatable element being provided with depending portions, the circular element on the base being provided with annular grooves on its upper horizontal and vertical surfaces the groove on its said horizontal surface being of varying depth in one direction and of constant depth in the opposite direction starting from the groove center, said depending portion and said horizontal and vertical surfaces being in substantially airtight contact.

2. A tool comprising a dressing point, a supporting micrometer head carrying said element, a slidable support carrying said head, said mounting being removably carried in said head, means releasably locking the head to the slidable support, and other means alining the head, on the support, said last named means comprising right angled tongue and groove connections on the head bottom and slidable support top for holding the head against longitudinal and lateral displacement, a unitary rotatable element carrying said supporting element, a circular platform supporting said rotatable element, a base supporting said platform and means fixing said platform to said base.

3. A tool comprising a base, a dressing point, its mounting, a supporting head carrying said mounting, a composite vertical support carrying said head, a supporting element for said vertical support, and means for releasably locking the head to said vertical support, said means including a shaft depending from the head, intersecting holes in said shaft, a horizontal bore in said support, and a vertical bore in said support, a tapered screw tapped in said support and adapted for cooperation with the said shaft holes and horizontal bore, a unitary rotatable element carrying said supporting element, a circular platform supporting said rotatable element and means fixing said platform to said base.

4. A tool comprising a base, a dressing point, its mounting, a micrometer head, said mounting being removably carried in said head, a composite vertical support carrying said head, a supporting element carrying said vertical support, grooved upper and undercut lower surfaces on the vertical support coacting with the head lower surface and supporting element respectively, a unitary rotatable element carrying said supporting element, a circular platform supporting said rotatable element, said platform being fixed to said base, and means positively ensuring the assembly of the rotatable element and platform in a predetermined relationship, said last named means comprising a plurality of interconnected elements including sleeves, a plurality of bores holding said sleeves and a transverse groove in the bottom of the supporting element, adapted to receive the top sleeve end therein.

5. A tool comprising a base, a dressing point, its mounting, a micrometer head, said mounting being removably carried in said head, a composite vertical support for and connected to said micrometer head, a supporting element carrying said vertical support, grooved upper and undercut lower surfaces on the vertical support coacting with the head lower surface and supporting element respectively, a unitary rotatable element carrying said supporting element, horizontal and vertical inner surfaces on said rotatable element, a circular platform supporting said rotatable element, said platform being fixed to said base, said platform being shaped to and contacting substantially the entire inner surfaces both horizontal and vertical of the rotatable element to substantially eliminate lost motion therebetween.

6. A tool comprising a base, a dressing point, its mounting, a micrometer head, said mounting being removably carried in said head, a composite vertical support carrying said head, a supporting element carrying said vertical support, grooved upper and undercut lower surfaces on the vertical supporting element coacting with the head lower surface and supporting element respectively, a unitary rotatable element carrying said supporting element, said rotatable element being provided with a depending circumferential flange, a circular platform supporting said rotatable element, said platform being affixed to said base and contacting substantially the entire bottom and inner flange surfaces of the rotatable element to substantially eliminate lost motion therebetween.

7. A tool comprising a dressing point and composite means supporting said point, said means including a micrometer head comprising a hollow cylindrical portion, a flanged sleeve secured therein, a tap in the sleeve bottom, a dressing point mounting, a holder for said mounting, means threaded in said tap and engaging the outer circumference of said holder and securing same against longitudinal displacement, an internally threaded recess in said mounting, screw means fitted therein, a second flanged sleeve threaded onto said holder, means threaded into said cylindrical portion and securing said second flanged sleeve therein, means surrounding said mounting and holding said dressing point against longitudinal rearward displacement, an annular ring spaced from said last named means and abutting said second flanged sleeve, an end piece abutting said cylindrical portion and fitted over the smaller end of said second flanged sleeve, cooperating indicia on said cylindrical portion and said end piece, an adjusting element, and means for locking said end piece to said last named element, said last named means comprising a bevel on the outer end of said end piece, a split ring located to be set against said bevel and an element so moving the ring whereby the said end piece and last named element are locked together.

ALFONSE T. GIGLIA.

REFERENCES CITED

The following references are of record in the file of this patent:

UNITED STATES PATENTS

| Number | Name | Date |
| --- | --- | --- |
| 159,115 | Parker | Jan. 26, 1875 |
| 829,976 | Lindgren | Sept. 4, 1906 |
| 1,250,359 | Sacrey | Dec. 18, 1917 |
| 1,332,398 | Hoagland | Mar. 2, 1920 |
| 1,368,499 | Hardy | Feb. 15, 1921 |
| 1,384,726 | Duplessie | July 12, 1921 |
| 1,387,427 | Miller | Aug. 9, 1921 |
| 1,563,900 | Gardner et al. | Dec. 1, 1925 |
| 1,880,234 | Bullock et al. | Oct. 4, 1932 |
| 1,938,769 | Strom | Dec. 12, 1933 |
| 1,992,768 | Pioch | Feb. 26, 1935 |
| 1,994,386 | Dardani | Mar. 12, 1935 |
| 2,118,902 | Spicacci | May 31, 1938 |
| 2,309,924 | Root | Feb. 2, 1943 |
| 2,366,623 | Jakobsen | Jan. 2, 1945 |
| 2,414,182 | Wessman | Jan. 14, 1947 |
| 2,442,453 | Bley | June 1, 1948 |

FOREIGN PATENTS

| Number | Country | Date |
| --- | --- | --- |
| 485,939 | Germany | Nov. 18, 1929 |
| 550,415 | Great Britain | Jan. 7, 1943 |